Aug. 6, 1935.    H. E. WINKLER    2,010,793
DRIVING MECHANISM
Filed March 26, 1934    4 Sheets-Sheet 1

INVENTOR.
Herman E. Winkler
BY
ATTORNEYS.

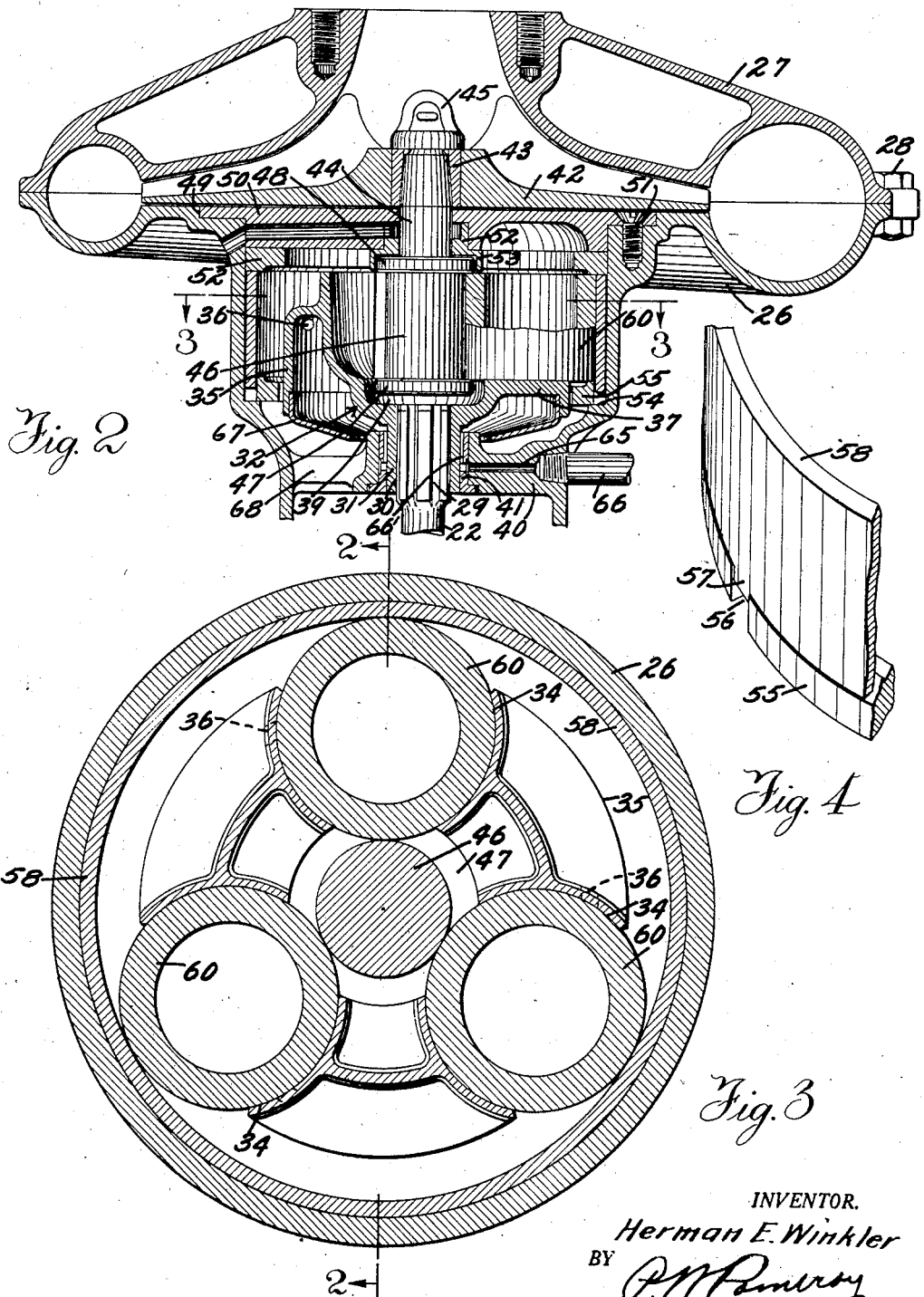

Aug. 6, 1935.  H. E. WINKLER  2,010,793
DRIVING MECHANISM
Filed March 26, 1934  4 Sheets-Sheet 3
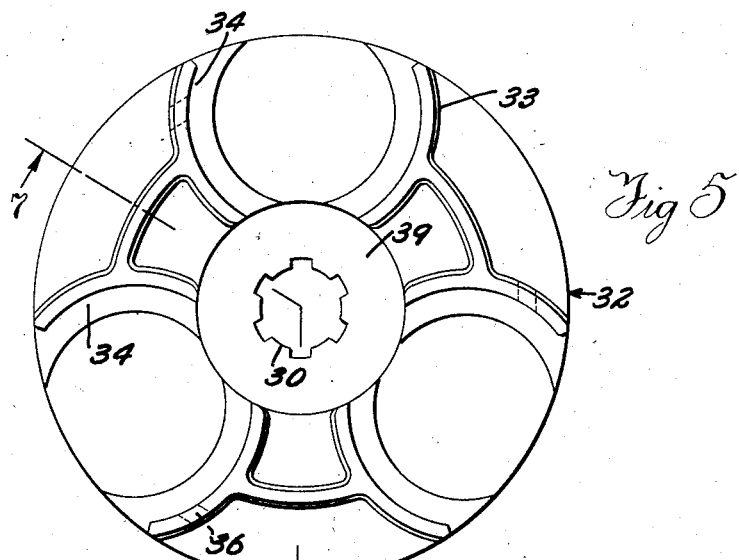
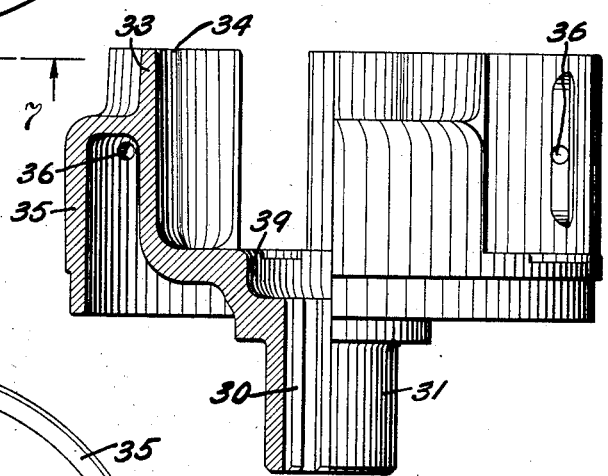
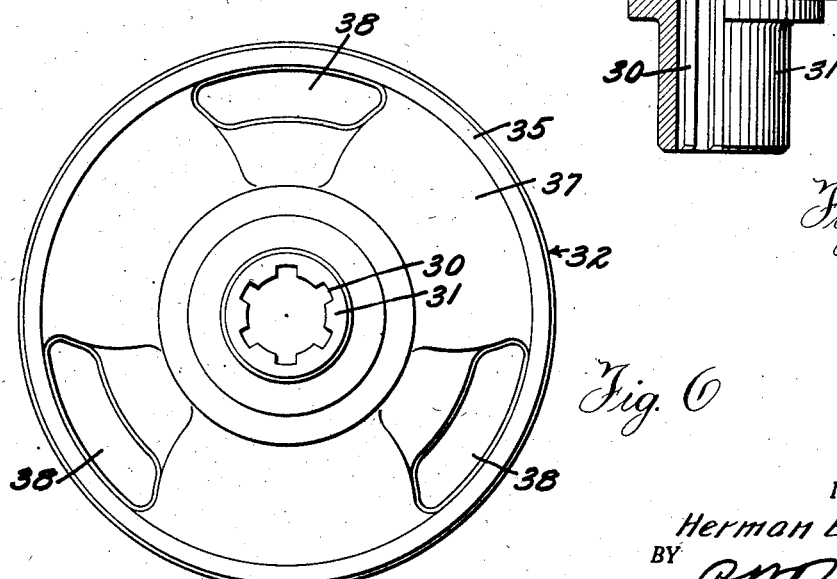
INVENTOR.
Herman E. Winkler
BY
ATTORNEYS.

Aug. 6, 1935.   H. E. WINKLER   2,010,793
DRIVING MECHANISM
Filed March 26, 1934   4 Sheets-Sheet 4

INVENTOR.
Herman E. Winkler
BY
P. H. Pomeroy
ATTORNEYS

Patented Aug. 6, 1935

2,010,793

UNITED STATES PATENT OFFICE 2,010,793

DRIVING MECHANISM

Herman E. Winkler, Indianapolis, Ind., assignor to Schwitzer-Cummins Company, Indianapolis, Ind., a corporation of Indiana Application March 26, 1934, Serial No. 717,360

14 Claims. (Cl. 74—302)

This invention relates to driving mechanisms and particularly to that type of driving mechanism which will cause the driven member to rotate at a greater speed than the driving member.

The principal object of my invention is to provide a drive for a relatively fast rotating member which is positive under normal driving conditions and which will permit relative movement between the driving and driven members under abnormal loads.

Another object is to provide a drive for a rotatable driven member in which a deflectable ring is interposed between the rotatable driving members and a fixed casing to prevent slipping between the driving and driven members.

Another object is to provide a drive for a rotatable driven member which includes a deflectable ring fixed against rotation encircling the driving members and the driven member, the normal inner diameter of the ring being less than the combined diameters of two of the driving members and the driven member.

Another object is to provide a drive for a rotatable driven member which includes a deflectable ring fixed against rotation encircling spaced driving members and the driven member therebetween, the normal inner diameter of the ring being less than the combined diameters of two of the driving members and the driven member, whereby the rotation of the driving members on the inner face of the ring will cause deflection of the ring at successive points therealong.

Another object is to provide a drive for a rotatable driven member in which a deflectable ring having a normal inner diameter less than the combined diameters of two of the driving members and a driven member therebetween and an outer diameter less than the inner diameter of a fixed casing is interposed between the driving members and a fixed casing to prevent slipping between the driving and driven members.

Another object is to provide a drive for a member rotatably mounted in a fixed casing in which the driving shaft is fixed to a spider also rotatable within the casing having rollers rotatably supported thereby in contact with a roller rigidly fixed to the driven member, and having a deflectable ring interposed between the driving rollers and the casing to provide driving engagement between the driving rollers and the roller fixed to the driven member.

Another object is to provide a drive for a rotatable driven member which includes a deflectable ring fixed against rotation encircling spaced driving members and the driven member therebetween, the normal inner diameter of the ring being less than the combined diameters of two of the driving members and the driven member, the respective driving members, driven member, and ring being subjected to an oil bath, and a casing therefor forming a retainer for the oil.

A further object is to provide with an internal combustion engine a drive for a supercharger therefor in which the impeller is driven faster than the engine speed and in which the driven member of the driving mechanism is rigidly attached to the impeller.

A further object is to provide a supercharger drive in which the driving rollers form the radial bearing for the driven roller.

A still further object is to provide a supercharger drive in which the driving rollers form the radial and thrust bearings for the driven member connected with the impeller blade.

Another object is to provide a drive for a relatively fast rotating member in which the speed ratio between the driving and driven shafts can be changed by varying the driving rollers and driven roller and without changing the deflectable ring, or by changing the diameters of the driving rollers and deflectable ring and not disturbing the driven roller.

Other objects, and objects relating to details of construction and methods of manufacture will be apparent from the detailed description to follow.

Having described some of the principal objects and the advantages of my invention, the same will now be described in combination with the accompanying drawings in order that others skilled in the art may make and use the same. It is to be understood, however, that the drawings are to be taken for the purpose of illustration only and the invention is to be limited only by the scope of the sub-joined claims.

Heretofore considerable difficulty has been experienced in providing a suitable drive for a supercharger due to the fact that the impeller is rotated at a relatively high speed while the driving member rotates at a relatively low speed which necessarily requires a drive or a power transmission mechanism which will speed up the rotation of the driven member such as the impeller blade to several times the speed of the driving member of the transmission mechanism. Various gearing mechanisms have been used for that purpose but it has been found extremely difficult to form the gear teeth with sufficient accuracy to cause a smooth and quiet drive and which will withstand the high speed to which the several parts are subjected.

In my present invention, I have provided a drive which preferably has the driven member permanently attached to the impeller but which if desired may be interposed in the drive line between the driving shaft and the supercharger in spaced relationship to the impeller. In either case, my improved drive is quiet, efficient, positive in action under normal load conditions, and relatively inexpensive to manufacture.

While my invention is particularly adapted to supercharger drives, other uses may be found for the same and I, therefore, do not limit my invention to the particular use for which it is shown and described, the same being illustrative only of its adaptability.

In the accompanying drawings in which like numerals refer to like parts throughout the several views, Fig. 1 is a diagrammatic side elevational view of an internal combustion engine, showing my invention incorporated therewith, certain parts being broken away and in section to better illustrate the driving means.

Fig. 2 is an enlarged sectional view taken on the line 2—2 of Figs. 1 and 3, showing a supercharger and my driving mechanism connected therewith.

Fig. 3 is a sectional view taken on the lines 3—3 of Fig. 2, showing further details of the drive.

Fig. 4 is a fragmentary perspective view showing the deflectable ring which encircles the driving rollers with one means for preventing rotation of the ring relative to the rollers.

Fig. 5 is a top plan view of the spider for supporting the driving rollers.

Fig. 6 is a bottom plan view of the spider illustrated in Fig. 5.

Fig. 7 is a view of the spider partly in side elevation and partly in section taken on the line 7—7 of Fig. 5.

For the purpose of illustration only, I have shown a supercharger in conjunction with an internal combustion engine and driven from the generator shaft, but it is understood that the same may be driven from the engine crankshaft, the cam shaft or any other suitable power source which, if desired, may be wholly detached from the engine. Also, for the purpose of illustration only, I have shown my drive for use in combination with a supercharger as the same is especially adaptable for that use, although the same will find utility in other fields where it is desired to step up the speed of the driven member and which will permit operation of the driven member at a speed relatively greater than the driving member.

Figure 1:
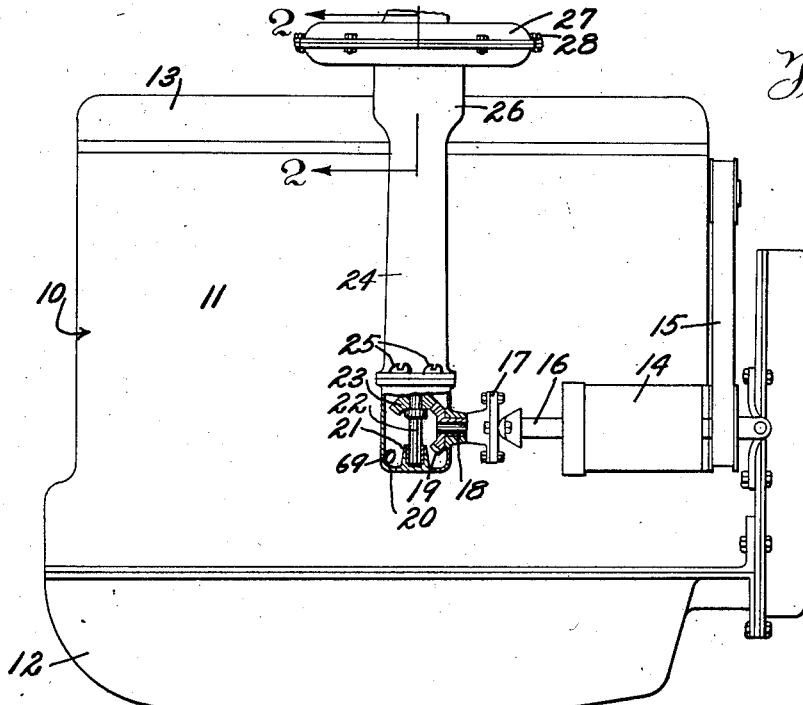

In Fig. 1, I have illustrated diagrammatically an internal combustion engine indicated generally by the numeral 10 having a cylinder block 11, a crankcase 12, and a cylinder head 13. As illustrated, the generator 14 is driven by the belt 15 and has a shaft 16 extending therefrom terminating in a universal joint 17 to which is attached a stub shaft 18 having a beveled gear 19 formed at the outer end thereof. The stub shaft 18 is suitably supported in a casing 20 attached to the cylinder block 11 in any suitable manner and has a boss 21 formed thereon drilled out to receive the bottom end of a shaft 22, which will hereinafter be referred to as the drive shaft. A beveled gear 23 is fixed to the drive shaft 22 and meshed with the beveled gear 19 on the stub shaft 18 to be driven thereby. Although I have shown bevel gears for driving the shaft 22, any other suitable means may be substituted therefor, as any approved connection with the power source may be employed. A casing 24 surrounding the shaft 22 is secured to the casing 20 as by the bolts 25 and terminates at its upper end in an enlarged head 26 which may form the lower part of the supercharger casing. The upper half 27 of the supercharger casing may be firmly attached to the casing portion 26 as with the bolts 28.

Referring to Fig. 2, the drive shaft 22 is splined at its upper end at 29 and fits into the splines 30 formed in the shank 31 of a spider, indicated generally by the numeral 32, which is rotatable with and has the same speed as the driving shaft 22 due to the splined connection therebetween.

As best shown in Figs. 5, 6 and 7, the spider 32 is formed with a plurality of walls 33 shaped to form roller receiving pockets 34 and with flanges 35 formed to provide receiving pockets for the lubricant. I also form holes 36 in the walls 34 to permit passage of the lubricant to the roller receiving pockets 34, the circulation of the lubricant being described later. The spider 32 is also provided with a bottom wall 37 in which are provided openings 38 for the flow of lubricant intermediate the roller receiving pockets 34 and with a depressed portion 39 adapted to receive the lower end of the driven shaft hereinafter to be described.

Referring again to Fig. 2, the casing 26 has a floor or support 40 in line with the shank 31 of the spider 32 in which is mounted a bushing 41 of relatively hard material to form a bearing for the upper end of the shaft 22 and the spider 32 connected therewith. The impeller 42 which is usually made from relatively soft material such as aluminium is drilled at its center to receive a bushing 43 in which is inserted the tapered upper end of a shaft 44 secured therein by the lock nut 45. A roller 46 is formed integrally on the shaft 44 and has flanges 47 and 48 at opposite ends thereof for a purpose to be hereinafter described. The casing 26 is recessed at 49 to receive the flanged edges of the plate 50 which is secured thereby to the screws 51, the plate 50 being positioned immediately below the impeller 42. Below the plate 50 is a ring or spider 52 having a recess or cup 53 therein at its center adapted to receive the flange 48 on the shaft 44. The casing 26 is also formed to provide the shoulder 54 on which is seated a ring 55 and which is notched at 56 to receive the tongue 57 formed on the deformable or deflectable ring 58 seated in the casing 26 between the spider 52 and the ring 55 and held against vertical movement therebetween. Rollers 60 positioned in the pockets 34 formed in the spider 32 are also mounted between the spider 52 and the ring 55 to be held against longitudinal movement therebetween. The rollers 60 contact with the driven roller 46 and the deflectable ring 58 to impart power to the driven shaft 44 and the impeller 42.

Figure 12:
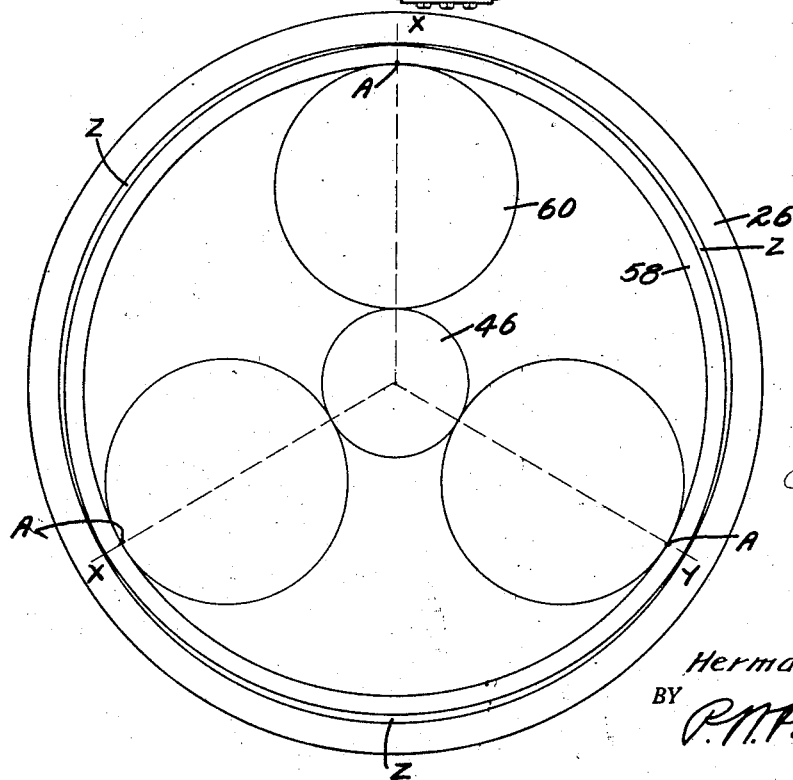
Fig. 12 is an exaggerated diagrammatic view showing the deflection of the ring interposed between driving rollers and the fixed casing.

Referring to Fig. 12 which diagrammatically illustrates the relation of the driving rollers 60 to the driven roller 46 and the deflectable ring 58. I have diagrammatically illustrated the distortion of the ring 58 which will take place during the operation of the drive. As illustrative of the proportion and clearances which may be provided, the outer diameter of the deflectable ring 58 may be .005 of an inch less than the inner diameter of the casing 26 surrounding it. The combined diameters of the driven roller 46 and two of the driving rollers 60 taken on the line X—X or X—Y would then be .005 of an inch greater than the inner diameter of the ring 58. Therefore, when the driven roller 46 and the driving roller 60 are assembled the ring 58 will be distorted so that it will contact with the casing 26 at the points A where the driving rollers 60 engage with the inner diameter thereof.

Due to the deflection of the ring 58, the same will be out of round and there will be considerably more than .005 of an inch space between the ring and the casing 26 intermediate the driving rollers 60 as indicated at Z. As the rollers 60 rotate about the inner diameter of the ring 58, the latter will be caused to press against the inner wall of the casing 26 during such rotation to cause deflection of the ring 58 at successive points therealong. It has also been found that when the ring 58 is made relatively heavy, that it need not have a close fit with the casing 26 to contact therewith at the points A, as it may comprise the outer member of the driving means independently of the casing, under which conditions the casing 26 will merely form the lubricant retainer.

As stated in one of the objects of the invention, the driving rollers 60 provide both a radial and thrust bearing for the driven roller 46. As the driving rollers 60 are maintained against longitudinal movement between the spider 52 and the ring 54 and as the flange 47 at the bottom of the driven roller 46 lies beneath the driving rollers 60 and the flange 48 above the driven roller 46 lies above the driving rollers 60, the driving rollers 60 provide the thrust bearing for the driven shaft 44 so that it and the impeller 42 are maintained against vertical movement. Also, the driving rollers 60, because of their driving contact with the driven roller 46, provide the sole radial bearing therefor. It will thus be seen that I have provided bearing means for the driven member which does not require accurate positioning of the latter as it does not need to be on a true center with the spider 52 or the plate 50 and the driven shaft 44 does not need to contact with either the spider 52 or the plate 50.

It is desirable to lubricate the several parts of my drive, and as one means I have shown a passageway 65 in the casing 26 (see Fig. 2) in which is inserted a pipe 66 adapted to be connected with an oil pump (not shown) or any suitable lubricant supply whereby lubricant will be fed to the passageway 65. Suitable grooves 66' formed in the bushing 41 connect with the passageway 65 so that the lubricant will be thrown by centrifugal force due to the rapid rotation of the spider 32 into the openings 36 formed in the walls 33 of the spider against the rollers 60.

To assist in keeping a proper head of lubricant in the casing 26, I provide a baffle 67 attached to the spider 32, also shown in Fig. 2. The lubricant passes up to the openings 36 through the slots 38 formed in the bottom wall 37 of the spider 32 shown in Fig. 6. The lubricant after flowing around the driving rollers 60 and the driven roller 46 will work its way back into the casing 26 and flow through the opening 68 formed in the floor 40 back into the casing 20 to lubricate the beveled gears 19 and 23 from whence it may flow through the opening 69 into the engine to again be pumped through the pipe 66 to complete the circulating system.

Having now described the several parts of my invention, the operation of the same will now be described:

The source of power or primary driving shaft, may be driven at engine speed, greater than engine speed, or less than engine speed at the will of the designer, which by the way of illustration is the generator shaft 16 connected with the drive shaft 22 through the beveled gears 19 and 23. The drive shaft 22 rotates the spider 32 at the same speed therewith and with it the driving rollers 60 which are interposed between the driven roller 46 and the deflectable ring 58 positioned outwardly of the driving rollers 60 in the casing 26. The speed at which the impeller 42 is driven is, of course, dependent upon the relative proportions of the driven roller and the deflectable ring 58 surrounding the driving rollers 60, which is illustrated as having a driving ratio of 5 to 1; that is, the driven shaft 44 and with it the impeller 42 will be driven at five times the speed of the driving shaft 22.

While I have shown three driving rollers as such a construction is relatively cheap to manufacture and very efficient in use, it will be understood that in some cases a greater number of driving rollers may be employed and, therefore, the invention is in no way limited to the driving ratio which I have illustrated or the number of driving rollers which may be employed.

Figure 8:
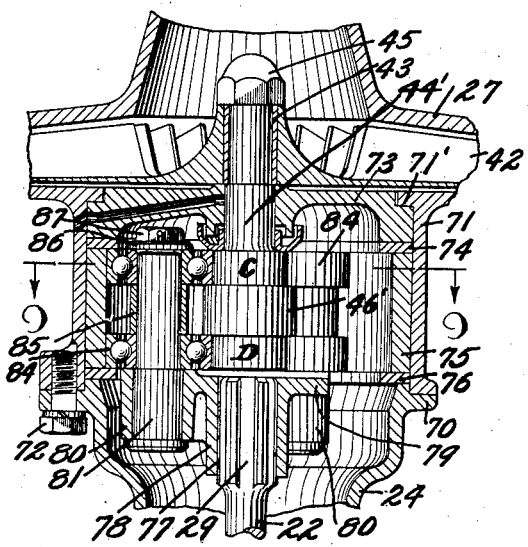
Fig. 8 is a view similar to Fig. 2, on a smaller scale, showing a modified form of my invention.
Figure 9:
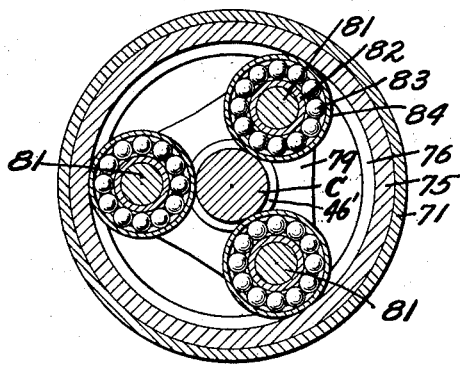
Fig. 9 is a sectional view similar to Fig. 3 taken on the line 9—9 of Fig. 8.

While the drive shown in Figs. 8 and 9 embodies the same principles as shown in the preceding views, I accomplish the results by a slightly different form of construction in which the casing 24 terminates at its upper end in a flange 70 on which is mounted a casing 71 which may form the lower half of the supercharger casing and which is secured to the casing 24 by the bolts 72. The impeller 42 is of substantially the same construction as shown in Fig. 2 and is drilled at its center to receive the bushing 43 in which is inserted the reduced upper end of the driven shaft 44' secured therein by the lock nut 45. The driven shaft 44' has a roller 46' formed thereon, the same being of stepped construction having a large central portion and portions C and D at opposite sides thereof to be driven by the driving rollers.

The casing 71 is cylindrical and terminates at the top in an inwardly extending flange 71' against which the plate 73 is adapted to abut. Immediately below the plate 73 is a ring 74 and below that a deformable or deflectable ring 75 similar to the ring 58 shown in the preceding views beneath which is a ring 76. The plate 73, the ring 74, the deformable ring 75 and the ring 76 may in order be inserted in the casing 71 and clamped in position therein by the bolts 72 which connect the casings 24 and 71 together.

As in the preceding construction, the drive shaft 22 is splined at 29 at its upper end and is received in the spline 77 formed in the shank 78 of the spider 79 which has a plurality of equally-spaced drilled bosses 80 formed thereon. A pin or stud 81 extending through each of the drilled bosses 80 has spaced ball bearings comprising inner race members 82, balls 83, and outer race members 84 positioned thereon of a suitable size to contact with the inner face of the deformable ring 75 and the reduced portions C and D of the roller 46'. A spacing ring 85 is inserted on each of the pins 81 intermediate the ball bearings previously described, the parts being held in assembled relation by the washers 86 and nuts 87.

In this construction, as in the previously described construction, the driving rollers which comprise the ball bearings provide the radial and thrust bearings for the driven shaft 44' and the impeller 42. As the outer race members 84 of the ball bearings are maintained against longitudinal movement of the opposite sides of the central portion of the roller 46' on the driven shaft 44', the driven shaft 44' and with it the impeller 42 is maintained against vertical or axial movement. Also, the driving rollers which in this case comprise the ball bearings because of their driving contact with the portions C and D of the driven roller 46', provide the sole radial bearing therefor. As in the previous construction, it will be seen that I have provided bearing means for the driven member which does not require accurate positioning thereof as it does not need to be on a true center with the plate 73, and in fact the driven shaft 44' does not need to contact therewith.

Reference may again be had to Fig. 12 to show the relation of the driving rollers to the driven roller and the deflectable ring. As in the previously described construction, the outer diameter of the deflectable ring 75 may be smaller than the inner diameter of the casing 71, while the total diameters of two of the ball bearings and driven roller contacting therewith is greater than the inner diameter of the ring 75 so that when the driven roller 46' and the ball bearings mounted on the spider 79 are assembled, the ring 75 will be distorted so that it will contact with the casing 71 at the points where the ball bearings engage with the inner diameter thereof. In other words, the same example given for the dimensions of the respective parts in the preceding views, may apply to the constructions shown in Figs. 8 and 9 and, therefore, the driving operation will be substantially the same. Also, the outer casing may be used only as the oil retainer out of contact with the ring 75 for the same reasons as previously described.

The driving shaft 22 rotates the spider 79 at the same speed therewith and with it the ball bearings which constitute the driving rollers and which are interposed between the portions C and D of the driven roller 46' and the deflectable ring 75 positioned outwardly of the ball bearings in the casing 71. The speed at which the impeller 42 is driven is, of course, dependent upon the relative proportions of the driven roller and the deflectable ring as has been previously described.

Figure 10:
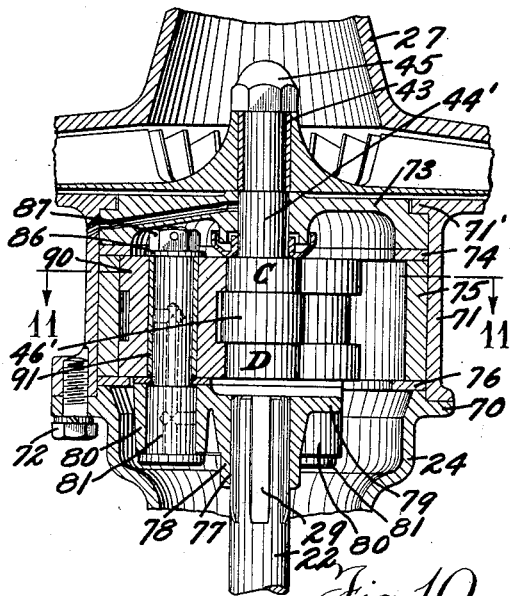
Fig. 10 is a view similar to Fig. 8, showing a further modified form of my invention.
Figure 11:
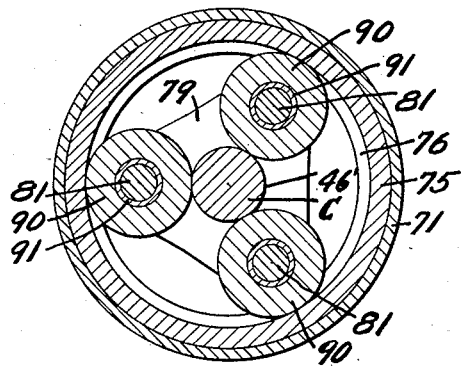
Fig. 11 is a sectional view taken on the line 11—11 of Fig. 10.

Figs. 10 and 11 show another slightly modified form of my invention in which the casing 24 terminates at its upper edge in a flange 70 on which is mounted a casing 71 having an inwardly directed flange 71' formed at the top thereon. The impeller 42 is drilled out to receive the bushing 43 in which is inserted the driven shaft 44' having a roller 46' formed thereon and which comprises a large central portion and reduced side portions C and D. The driven shaft 44' is attached to the impeller 42 by the lock nut 45. This construction also comprises the plate 73, the ring 74, the deflectable ring 75 and the bottom ring 76 positioned and secured in the order described in the casing 71 by the bolts 72 which attach the casings 24 and 71 together. As illustrated, the driving shaft 22 is splined at its upper end 29 and is received in the spline 77 formed in the shank 78 of the spider 79 on which are formed equally-spaced drilled bosses 80 and through which extend the studs 81. Instead of mounting ball bearings on the studs 81 as in the previously described construction, I mount rollers 90 thereon which are secured against longitudinal movement by the washers 86 and the lock nuts 87 screwed on the studs 81. As described in connection with Fig. 8, the rollers 90 are formed to suitable size to contact with the portions C and D of the driven roller 46' and with the deflectable ring 75. If desired, the bushings 91 may be interposed between the rollers 90 and the studs 81 which may be of hardened material to afford longer life to those rotating parts.

Again reference may be had to Fig. 12 as illustrating the relation of the driving rollers 90 to the driven roller 46' and the deflectable ring 75, as the proportion of parts may be the same for this construction as in the previously described construction and the operation is the same and the description thereof need not be repeated.

As previously stated, I have provided a drive which is positive under normal driving conditions as slippage between the driving and driven rollers is eliminated by the deflectable ring; however, under sudden shock or abnormal conditions, the driving rollers are permitted to slip relative to the driven roller and, therefore, prevent any breakage of parts and damage to the drive which would occur if the parts were positively driven as, for example, by gears.

While I have shown a preferred embodiment of my invention and two modifications, it will be understood by those skilled in the art that changes in construction, proportions of parts and details in design may be resorted to without departing from the spirit and substance of my invention, the scope of which is to be measured entirely by the scope of the subjoined claims.

What I claim is:

1. A driving mechanism comprising, drive and driven shafts in end-to-end relation, a spider secured to said drive shaft extending outwardly therefrom surrounding said driven shaft, a plurality of driving members rotatable about their own axes driven by said spider engaging said driven shaft, a deflectable member surrounding and engaging said driving members thereby rotating said driven shaft at a greater speed than said drive shaft, and centrifugally operated means driven by said drive shaft to distribute lubricant to said driving members.

2. A driving mechanism comprising, drive and driven shafts in end-to-end relation, a plurality of driving rollers in axial alignment with and beyond the end of said drive shaft engaging said driven shaft, a deflectable ring surrounding and engaging said driving rollers thereby rotating said driven shaft at a greater speed than said drive shaft, and centrifugally operated means driven by said drive shaft to distribute lubricant to said rollers.

3. A driving mechanism comprising, a drive shaft, a driven shaft having a roller formed thereon, flanges at opposite ends of said roller, a plurality of driving rollers rotated by said driving shaft forming the radial bearing for said driven roller and cooperating with said flanges to provide the thrust bearing therefor, a casing surrounding said driving rollers, a deformable ring interposed between said driving rollers casing engaging said rollers and engaging said casing adjacent to the points of contact of said rollers but spaced from said casing intermediate said rollers, and means driven by said drive shaft to distribute lubricant to said rollers.

4. A driving mechanism comprising, a drive shaft, a spider secured to said shaft to rotate therewith, rollers carried by said spider rotatable about the axis of said drive shaft, a driven shaft having a roller formed thereon in driving contact with said rollers, a casing surrounding said rollers, a deformable ring interposed between said rollers and casing engaging said rollers and engaging said casing adjacent to the points of contact of said rollers but deformed out of contact with said casing intermediate said rollers, and means on said spider to distribute lubricant to said rollers.

5. A driving mechanism comprising, a drive shaft and a driven shaft in end-to-end relation, a spider secured to said shaft to rotate therewith, rollers carried by said spider rotatable about the axis of said drive shaft, said driven shaft having a roller formed thereon in driving contact with said rollers, a deformable ring surrounding and engaging said rollers, and means on said spider to distribute lubricant to said rollers.

6. A driving mechanism comprising, a drive shaft, a roller support carried by said drive shaft, a plurality of equally-spaced rollers carried by said support bodily rotated about the axis of said drive shaft and each roller rotated about its own axis, a driven shaft having a roller formed thereon, flanges at opposite ends of said roller, said rollers on said supports forming the radial bearing for said driven roller and cooperating with said flanges to provide the thrust bearing therefor, a casing surrounding said rollers, and a deformable ring interposed between said rollers and casing engaging said rollers and engaging said casing adjacent to the points of contact with said rollers but deformed out of contact with said casing intermediate said rollers.

7. A driving mechanism comprising, a drive shaft, a casing surrounding said shaft, a plurality of rollers bodily rotated by said shaft within said casing, a driven member in end-to-end relation to said drive shaft, a roller formed on said driven shaft engageable with said driving rollers to be rotated thereby, a deformable member interposed between said driving rollers and casing engaging said rollers and engaging said casing adjacent to the points of contact with said rollers but deformed out of contact with said casing intermediate said rollers, and centrifugally operated means driven by said drive shaft to distribute lubricant to said driving rollers.

8. A supercharger drive comprising, a driving shaft, equally-spaced driving rollers in axial alignment with said drive shaft rotated thereby, a driven shaft in end-to-end relation to said drive shaft directly connected with the supercharger impeller having a roller formed thereon in contact with said driving rollers, a casing surrounding said driving rollers, deformable means interposed between said driving rollers and casing and centrifugally operated means driven by said driving shaft to distribute lubricant to said driving rollers.

9. A supercharger drive comprising, a drive shaft, a plurality of driving rollers bodily rotated thereby, a driven shaft directly connected with the supercharger impeller, a roller formed on said driven shaft in contact with said driving rollers, flanges at the opposite ends of said roller, said driving rollers forming the radial bearing for said driven shaft and impeller and cooperating with said flanges to provide the thrust bearing therefor, a casing surrounding said driving rollers, and a deformable ring having an outer diameter less than the inner diameter of said casing interposed between said driving rollers and casing and deformed to contact with said rollers and with said casing at the points adjacent said rollers.

10. A supercharger drive comprising, a driving shaft, a plurality of driving rollers bodily rotated thereby, a driven shaft directly connected with the supercharger impeller, a roller formed on said driven shaft in contact with said driving rollers, flanges formed on said driven shaft above and below said driving rollers adapted to contact with the edge faces thereof to provide the thrust bearing for said driven shaft and impeller, a casing surrounding said driving rollers, and a deformable ring having an outer diameter less than the inner diameter of said casing interposed between said driving rollers and casing and deformed to contact with said rollers and with said casing at the points adjacent to said rollers.

11. In combination with an internal combustion engine, a supercharger drive comprising, a vertical drive shaft driven by said engine, a spider rotatable therewith, rollers carried by said spider rotatable about the axis of said drive shaft, a driven shaft having an impeller directly connected therewith, a roller on said driven shaft in driving contact with said driving rollers, a casing surrounding said driving rollers, means interposed between said driving rollers and casing to maintain said driving rollers in driving contact with said driven roller, lubricant circulating means comprising, means on said spider to distribute said lubricant to said rollers, and means to direct the lubricant back to said engine.

12. A supercharger drive comprising, a driving shaft, a plurality of driving rollers bodily rotated thereby, a driven shaft directly connected with the supercharger impeller, a roller formed on said driven shaft in driving contact with said driving rollers, flanges at opposite ends of said roller, said driving rollers also contacting with said flanges whereby said rollers and flanges form the sole radial and axial support for said driven shaft and impeller, a casing surrounding said driving rollers, and means interposed between said driving rollers and casing to maintain said driving rollers in driving contact with said driven roller.

13. A supercharger drive comprising, a driving shaft, a plurality of driving rollers bodily rotated thereby, a driven shaft in end-to-end relation to said driving shaft directly connected with the supercharger impeller, a roller formed on said driven shaft in contact with said driving rollers, said driving rollers forming the sole radial support for said driven shaft and impeller, means including said driving rollers forming the sole axial support for said driven shaft and impeller and a deformable ring surrounding said driving rollers to maintain said driving rollers in driving contact with said driven roller.

14. A driving mechanism comprising, a drive shaft, a plurality of members bodily rotated thereby, a driven member in driving engagement with said first members, a casing surrounding said members, means interposed between said first members and casing deformed to contact with said members and casing at substantially equally-spaced points, and centrifugally operated means driven by said drive shaft to distribute lubricant to said first-named members and driven member.

HERMAN E. WINKLER.